Patented July 26, 1927.

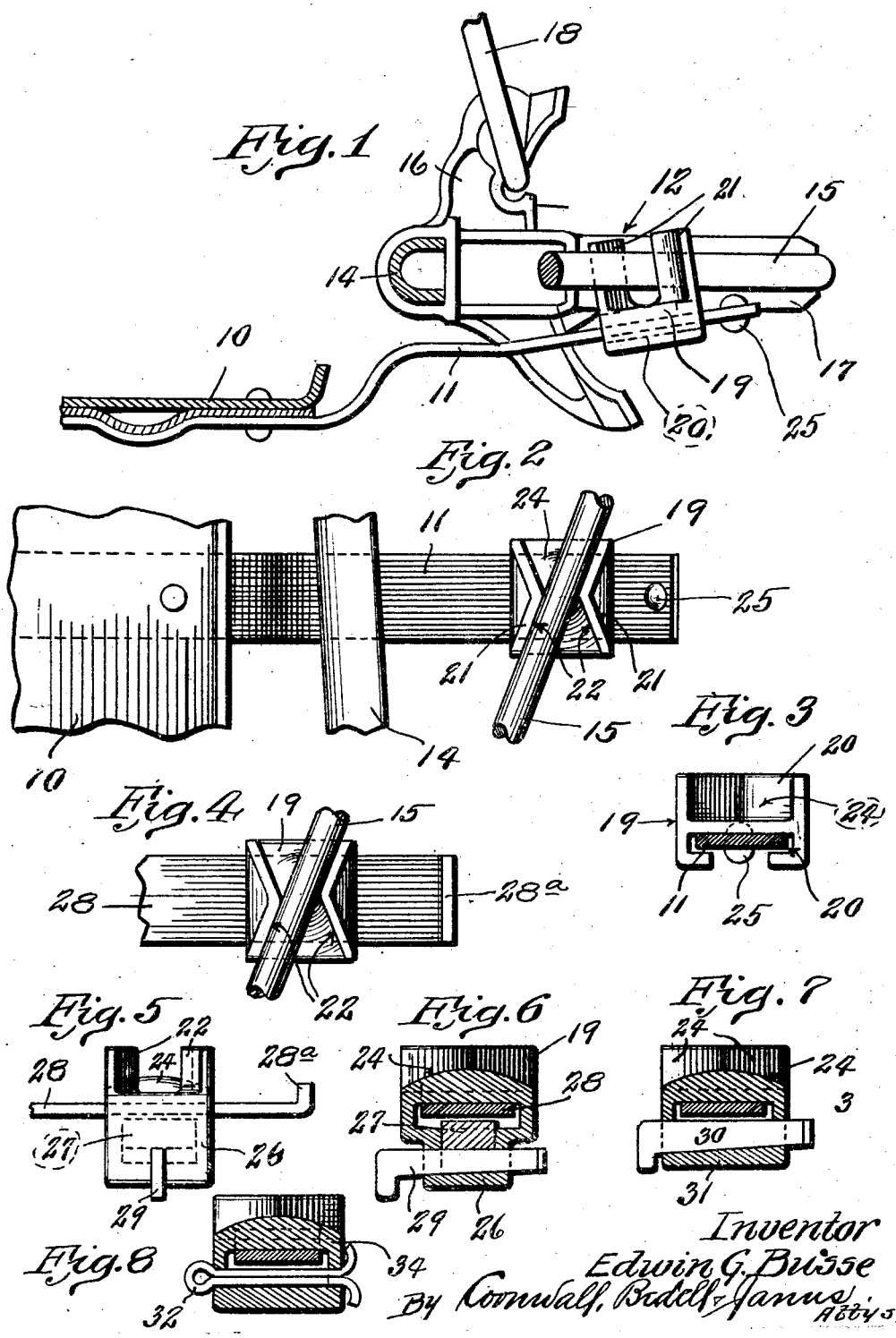

1,636,848

UNITED STATES PATENT OFFICE.

EDWIN G. BUSSE, OF CHICAGO, ILLINOIS, ASSIGNOR TO CHICAGO RAILWAY EQUIPMENT COMPANY, OF CHICAGO, ILLINOIS, A CORPORATION OF ILLINOIS.

TWO-WAY BRAKE-BEAM SUPPORT CHAIR.

Application filed August 26, 1924. Serial No. 734,203.

This invention relates to new and useful improvements in two-way sliding supports for brake beams and the objects of the invention are to provide a one-piece sliding support or chair which is reversible and can be used interchangeably on either side of the brake beam.

Further objects of the invention are to provide a support adapted to be slidably mounted on the spring or track member and having a seat provided with oppositely disposed anti-clinal walls whereby said support can be used on either side of the brake beam for supporting the angularly disposed portions of the tension member.

Still further objects of the invention are to provide a sliding support for brake beams adapted to slidably engage the track member and to provide means for preventing accidental disengagement of said support from said track members.

With these and other objects in view, my invention consists in certain novel features of construction and arrangement of parts, hereinafter more fully described and claimed, and illustrated in the accompanying drawings, in which—

Figure 1 is a side elevational view of the support and the track member thereof with the brake beam partly in cross section.

Figure 2 is a top plan view of the support and the track member and portions of the brake beam.

Figure 3 is an end elevational view of the support with the track member in cross section.

Figure 4 is a top plan view of a modified form of track member and the support.

Figure 5 is a side elevational view of same.

Figure 6 is a vertical cross section taken transversely through the support and the track member.

Figure 7 is a vertical cross section taken transversely through another modified form of brake beam support.

Figure 8 is a vertical cross section through a support showing modified means for locking the same in position.

The present invention is particularly designed for use in conjunction with four point supports for brake beams wherein the brake beam is slidably supported on track members secured to a part of the car truck and extending under and transversely of said brake beam and to each side thereof.

In the construction of trussed brake beams, the tension member thereof converges toward the strut member or center line of the beam and in providing a sliding chair for engaging said tension member it is necessary to provide either separate chairs for the oppositely inclined portions of the tension member or a chair which is adaptable to be used on either side of the brake beam. The chair described in this application consists of a single piece having a beam engaging face provided with intersecting oppositely inclined seats for accommodating either portion of the tension member so that said chair may be used in reversed position on either side of the beam.

Referring by numerals to the accompanying drawings, 10 designates a spring plank of a car truck to which is fixed in any suitable manner a track member 11 which extends under a brake beam 12. This brake beam, which is of trussed type, is of usual construction and comprises a compression member 14, tension member 15, a strut 17, and brake heads 16. The latter are suspended by hangers 18 and support the beam in position. Tracks 11 are arranged in pairs, each pair being disposed equidistant on each side of strut 17 and serve as additional supports for the brake beam.

In the present case, the beam has a supporting engagement with the track members 11 by means of chairs 19 which are slidably arranged on track members 11 and engage tension member 15. Each chair 19 is provided in the lower end with a horizontally disposed open-ended slot or under-cut groove 20 which is of suitable shape and dimensions so as to allow said chair to be slidably positioned on track 11, the latter traversing said groove or slot 20. The upper end of each chair is provided with upwardly projecting portions 21 having oppositely disposed anti-clinal walls 22 arranged to form oppositely inclined seats for receiving the inclined portions of the tension member. These seats intersect each other at a point in alignment with the vertical center of the chair whereby said chair may be turned and reversely placed on the track without affecting the location of said seats. The bottom of these seats is formed convex as indicated at 24 in order to provide a suitable bearing surface for engaging the portions of the tension member.

In order to prevent accidental withdrawal or displacement of the chair from the track member, the extreme end of the latter is provided with a protuberance or projection such as a rivet 25 which projects in both directions and the height of which is greater than the height of slot 20, thereby locking the chair in position on the track member. In the form just described, to remove the chair from the track member, it is necessary to first remove rivet 25.

In the form shown in Figures 4 to 6, a chair is shown having a housing 26 depending from the lower end thereof and located in said housing is a block 27 which extends into the slot and terminates a short distance below the track member, thereby limiting the upward movement of the chair with respect to said track member. The extreme end of track member 28 is turned upwardly as indicated at 28ª and forms a stop for said chair. A wedge key 29 is seated in suitable openings in the walls of housing 26 and locks block 27 in raised position.

To remove the chair from track member 28, it is necessary to first withdraw the wedge key 29 from housing 26, thereby allowing block 27 to drop downwardly so that the chair may be raised upwardly a suitable distance to clear the upturned end 28ª of track member 28.

In the modified form shown in Figure 7, a wedge key 30 is seated in the lower end of a chair 31 transversely of the track member and limits the upward movement of said chair with respect to said track member.

In Figure 8 a cotter pin 32 is arranged in a chair 34 for locking the latter against upward movement when in position on the track member. The wedge key and cotter pin are secured against displacement by bending or splitting the entering ends thereof.

I claim:

1. A sliding chair for brake beams provided with a track engaging portion at its lower end and having the upper end formed with angularly disposed seats for engaging and supporting either one of the oppositely inclined portions of said brake beam member.

2. A sliding chair for trussed brake beams having its lower end adapted to slidably engage a track member and provided in its upper end with a pair of oppositely inclined seats adapted to receive correspondingly inclined portions of the tension member of said brake beam.

3. A reversible sliding support for brake beams comprising a member having a lower end adapted to enter into sliding interengagement with a track member and having its upper end provided with upwardly disposed projections having oppositely disposed anti-clinal walls for interchangeably engaging the oppositely inclined portions of a brake beam tension member.

4. A two-way chair for brake beams comprising a member having the lower end adapted to be slidably positioned on a track member and having the upper end formed with opposed anti-clinal walls designed to from seats for receiving and engaging an angularly disposed part of a brake beam, said seats being angularly disposed relative to each other whereby said chair may be used interchangeably on either side of the center line of a brake beam.

5. A support for brake beams comprising a member adapted to be positioned on a track and having its upper end provided with a slot having angular walls forming two oppositely inclined seats for interchangeably receiving the corresponding inclined portions of a brake beam.

6. A support for brake beams comprising a member adapted to be positioned on a track and having its upper end slotted to form a continuous passage with the side walls converging inwardly from opposite ends to form two oppositely inclined seats for receiving the inclined portions of a brake beam, and means cooperating with said support for locking it against withdrawal from said track.

7. A support for brake beams comprising a member adapted to be positioned on a track and having its upper end slotted to form two oppositely inclined seats for receiving the inclined portions of a brake beam, and removable means in said support for preventing said support from moving into a track disengaging position.

8. A brake beam support comprising a track fixed to a part of a truck and provided at its end with a laterally projecting portion, a sliding chair movably mounted on said track and adapted to support a part of a brake beam, and means engaging said track and said support for normally preventing the support from displacement by maintaining it in position engageable by said projection.

9. A brake beam support comprising a track fixed to a part of a truck and provided at its end with a laterally extending projection, a sliding chair movably mounted on said track and adapted to support a part of a brake beam, and a member removably carried by said chair and cooperating with said track for locking said chair in engageable relation with said track projection.

10. A brake beam support comprising a track fixed to a part of a car truck, a chair slidably mounted on said track and adapted to support the brake beam part, said track being provided with a chair engaging projection when the latter occupies its operative or normal position, a block movably arranged in the lower end of said chair and adapted to bear against the underside of said track member, and a member removably carried by said chair and engaging said block for maintaining the latter in its track engaging position.

11. A reversible support for brake beams adapted to be slidably arranged on a track and engage the tension member of a brake beam, and removable means carried by the support and cooperating with the track to hold said support against displacement from said track.

12. A reversible support for brake beams adapted to be slidably mounted on a track and support a brake beam member, and means carried by said support and adapted to cooperate with said track for preventing the withdrawal of said support from said track.

13. A reversible support for brake beams adapted to be slidably mounted on a track and having oppositely inclined seats formed in its upper ends for engaging the oppositely inclined portions of a brake beam member, and means for locking said support in position on said track member.

14. A reversible fourth point support for brake beams having an apertured lower end for slidably engaging a track and provided in its upper end with a pair of seats angularly disposed relative to each other for engaging and supporting the oppositely inclined portions of a brake beam member, a member movably mounted in the lower end of said support for engaging the underside of said track and locking said support against movement into a track disengaging position, and a removable member in said support for maintaining said block in operative or locking position.

In testimony whereof I hereunto affix my signature this twenty-first day of August, 1924.

EDWIN G. BUSSE.